US012223274B2

(12) United States Patent
Barkan et al.

(10) Patent No.: US 12,223,274 B2
(45) Date of Patent: Feb. 11, 2025

(54) REPRESENTATION LEARNING WITH SIDE INFORMATION

(71) Applicant: Microsoft Technology Licensing, LLC, Redmond, WA (US)

(72) Inventors: Oren Barkan, Rishon Lezion (IL); Avi Caciularu, Tel Aviv (IL); Idan Rejwan, Tel Aviv (IL); Yonathan Weill, Tel Aviv (IL); Noam Koenigstein, Tel-Aviv (IL); Ori Katz, Tel-Aviv (IL); Itzik Malkiel, Givaatayim (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 17/452,818

(22) Filed: Oct. 29, 2021

(65) Prior Publication Data
US 2023/0137718 A1    May 4, 2023

(51) Int. Cl.
*G06F 40/295*   (2020.01)
*G06F 16/28*   (2019.01)
(Continued)

(52) U.S. Cl.
CPC .......... *G06F 40/295* (2020.01); *G06F 16/282* (2019.01); *G06N 7/01* (2023.01); *G06N 20/00* (2019.01)

(58) Field of Classification Search
CPC ...... G06F 40/295; G06F 16/282; G06F 16/35; G06N 7/01; G06N 20/00
(Continued)

(56) References Cited

U.S. PATENT DOCUMENTS

| | | | |
|---|---|---|---|
| 6,928,425 B2 * | 8/2005 | Grefenstette | G06F 16/38 707/999.009 |
| 7,383,258 B2 | 6/2008 | Harik et al. | |

(Continued)

FOREIGN PATENT DOCUMENTS

| | | | | |
|---|---|---|---|---|
| CN | 112749272 | * | 5/2021 | ........... G06F 16/335 |
| CN | 112749272 A | | 5/2021 | |

OTHER PUBLICATIONS

Bayesian Hierarchical Words Representation Learning (Year: 2020).*
(Continued)

*Primary Examiner* — Pierre Louis Desir
*Assistant Examiner* — Fouzia Hye Solaiman
(74) *Attorney, Agent, or Firm* — Holzer Patel Drennan

(57) ABSTRACT

A relational similarity determination engine receives as input a dataset including a set of entities and co-occurrence data that defines co-occurrence relations for pairs of the entities. The relational similarity determination engine also receives as input side information defining explicit relations between the entities. The relational similarity determination engine jointly models the co-occurrence relations and the explicit relations for the entities to compute a similarity metric for each different pair of entities within the dataset. Based on the computed similarity metrics, the relational similarity determination engine identifies a most similar replacement entity from the dataset for each of the entities within the dataset. For a select entity received as an input, the relational similarity determination engine outputs the identified most similar replacement entity.

20 Claims, 7 Drawing Sheets

(51) Int. Cl.
G06N 7/01 (2023.01)
G06N 20/00 (2019.01)
(58) Field of Classification Search
USPC .......................................................... 704/9
See application file for complete search history.

(56) References Cited

U.S. PATENT DOCUMENTS

| | | | |
|---|---|---|---|
| 8,196,030 B1 | 6/2012 | Wang et al. | |
| 8,965,865 B2 | 2/2015 | Freire et al. | |
| 9,710,760 B2* | 7/2017 | Hill | G06F 18/24765 |
| 10,326,847 B1* | 6/2019 | Jammalamadaka | H04W 4/021 |
| 10,460,235 B1* | 10/2019 | Truong | G06F 16/90335 |
| 2006/0106847 A1* | 5/2006 | Eckardt, III | G06F 16/3323 |
| | | | 707/E17.093 |
| 2015/0066939 A1* | 3/2015 | Misra | G06F 16/355 |
| | | | 707/739 |
| 2016/0147871 A1* | 5/2016 | Kalyanpur | G06F 40/205 |
| | | | 707/728 |
| 2017/0068903 A1* | 3/2017 | Hakkani-Tur | G06N 20/00 |
| 2017/0344635 A1* | 11/2017 | Koenigstein | G06F 16/68 |
| 2018/0060302 A1* | 3/2018 | Liang | G06F 16/35 |
| 2018/0174671 A1* | 6/2018 | Cruz Huertas | G16H 10/60 |
| 2019/0294694 A1* | 9/2019 | Dash | G06F 17/18 |
| 2022/0027249 A1* | 1/2022 | Dua | G06F 11/3466 |

OTHER PUBLICATIONS

Zhang, et al., "Word Semantic Representations using Bayesian Probabilistic Tensor Factorization", In Proceedings of the Conference on Empirical Methods in Natural Language Processing (EMNLP), Oct. 25, 2014, pp. 1522-1531.
Salakhutdinov, et al., "Bayesian Probabilistic Matrix Factorization using Markov Chain Monte Carlo", In Proceedings of the 25th International Conference on Machine Learning (ICML), Jul. 5, 2008, pp. 880-887.
Schick, et al., "Attentive Mimicking: Better Word Embeddings by Attending to Informative Contexts", In Proceedings of the Conference of the North American Chapter of the Association for Computational Linguistics: Human Language Technologies (NAACL-HLT), Jun. 2, 2019, pp. 489-494.
Schick, et al., "Rare words: A Major Problem for Contextualized Representation and How to Fix it by Attentive Mimicking", In Proceedings of the Thirty-Fourth AAAI Conference on Artificial Intelligence (AAAI), vol. 34, No. 5, Apr. 3, 2020, pp. 8766-8774.
Tifrea, et al., "Poincare Glove: Hyperbolic Word Embeddings", In Proceedings of 7th International Conference on Learning Representations (ICLR), May 6, 2019, 24 Pages.
Vilnis, et al., "Word Representations via Gaussian Embedding", In Proceedings of 3rd International Conference on Learning Representations, May 7, 2015, 12 Pages.
Wang, et al., "Neural Graph Collaborative Filtering", In Proceedings of the 42nd international ACM SIGIR Conference on Research and Development in Information Retrieval, Jul. 21, 2019, pp. 165-174.
Wu, et al., "Collaborative Denoising Auto-Encoders for Top-N Recommender Systems", In Proceedings of the Ninth ACM International Conference on Web Search and Data Mining (WSDM), Feb. 22, 2016, pp. 153-162.
Yu, et al., "Improving Lexical Embeddings with Semantic Knowledge", In the Proceedings of the 52nd Annual Meeting of the Association for Computational Linguistics, vol. 2, Jun. 23, 2014, pp. 545-550.
Zhang, et al., "Content-Collaborative Disentanglement Representation Learning for Enhanced Recommendation", In Proceedings of Fourteenth ACM Conference on Recommender Systems, Sep. 22, 2020, pp. 43-52.
Barkan, et al., "Representation Learning via Variational Bayesian Networks", In Proceedings of the 30th ACM International Conference on Information & Knowledge Management, Nov. 1, 2021, pp. 78-88.

"International Search Report and Written Opinion Issued in PCT Application No. PCT/US22/042820", Mailed Date: Jan. 4, 2023, 11 Pages.
Pinter, et al., "Mimicking Word Embeddings using Subword RNNs", In Proceedings of the Conference on Empirical Methods in Natural Language Processing, Sep. 7, 2017, pp. 102-112.
"List of ICD-9 codes", Retrieved from: https://en.wikipedia.org/wiki/List_of_ICD-9_codes, Oct. 13, 2021, 1 Page.
"Mixture Models," Retrieved from: https://www.bayesserver.com/docs/techniques/mixture-models, Retrieved Date: Sep. 29, 2021, 6 Pages.
Arora, et al., "Learning Lexical Subspaces in a Distributional Vector Space", In Journal of Transactions of the Association for Computational Linguistics (TACL), vol. 8, Jun. 1, 2020, pp. 311-329.
Barkan, et al., "Attentive Item2vec: Neural Attentive User Representations", In Proceedings of IEEE International Conference on Acoustics, Speech and Signal Processing (ICASSP), May 4, 2020, pp. 3377-3381.
Barkan, et al., "Bayesian Hierarchical Words Representation Learning", In Proceedings of the 58th Annual Meeting of the Association for Computational Linguistics, Jul. 5, 2020, pp. 3871-3877.
Barkan, Oren, "Bayesian Neural Word Embedding", In Proceedings of the Thirty-First AAAI Conference on Artificial Intelligence, Feb. 4, 2017, pp. 3135-3143.
Barkan, et al., "Cold Item Recommendations via Hierarchical Item2vec", In Proceedings of IEEE International Conference on Data Mining (ICDM), Nov. 17, 2020, pp. 912-917.
Barkan, et al., "Item2vec: Neural Item Embedding for Collaborative Filtering", In Proceedings of the IEEE Machine earning for Signal Processing (MLSP), Sep. 13, 2016, 6 Pages.
Barkan, et al., "Within-Between Lexical Relation Classification", In Proceedings of the Conference on Empirical Methods in Natural Language Processing (EMNLP), Nov. 16, 2020, pp. 3521-3527.
Berry, Andrew C. , "The Accuracy of The Gaussian Approximation to the Sum of Independent Variates", In Journal of the Transactions of the American Mathematical Society, vol. 49, Issue 1, Jan. 1941, pp. 122-136.
Bishop, Christopher M., "Pattern Recognition and Machine Learning", In Publication of Springer, Mar. 29, 2006, 758 Pages.
Bojanowski, et al., "Enriching Word Vectors with Subword Information", In Journal of Transactions of the Association for Computational Linguistics, vol. 5, Dec. 1, 2017, pp. 135-146.
Bollegala, et al., "Joint Word Representation Learning using a Corpus and a Semantic Lexicon", In Proceedings of Thirtieth AAAI Conference on Artificial Intelligence, vol. 30, No. 1, Mar. 5, 2016, pp. 2690-2696.
Bražinskas, et al., "Embedding Words as Distributions with a Bayesian Skip-Gram Model", In Repository of arXiv:1711.11027v1, Nov. 29, 2017, 12 Pages.
Bruni, et al., "Multimodal Distributional Semantics", In Journal of Artificial Intelligence Research, vol. 49, Jan. 23, 2014, pp. 1-47.
Caciularu, et al., "Denoising Word Embeddings by Averaging in a Shared Space", In Proceedings of The Tenth Joint Conference on Lexical and Computational Semantics, Aug. 5, 2021, pp. 294-301.
Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.
Dror, et al., "Yahoo! Music Recommendations: Modeling Music Ratings with Temporal Dynamics and Item Taxonomy", In Proceedings of the fifth ACM Conference on Recommender systems, Oct. 23, 2011, pp. 165-172.
Dupret, et al., "Deducing a Term Taxonomy from Term Similarities", In Proceedings of ECML/PKDD Workshop on Knowledge Discovery and Ontologies, Oct. 3, 2005, pp. 11-22.
Faruqui, et al., "Retrofitting Word Vectors to Semantic Lexicons", In Proceedings of the Conference of the North American Chapter of the Association for Computational Linguistics: Human Language Technologies, May 31, 2015, opp. 1606-1615.
Finkelstein, et al., "Placing Search in Context: The Concept Revisited", In Proceedings of the 10th International Conference on World Wide Web, May 1, 2001, pp. 406-414.

(56) References Cited

OTHER PUBLICATIONS

Harper, et al., "The MovieLens Datasets: History and Context", In Journal of ACM Transactions on Interactive Intelligent Systems, vol. 5, Issue 4, Article 19, Dec. 2015, 19 Pages.
He, et al., "Sherlock: Sparse Hierarchical Embeddings for Visually-Aware One-Class Collaborative Filtering", In Proceedings of the Twenty-Fifth International Joint Conference on Artificial Intelligence (IJCAI), Jul. 9, 2016, pp. 3740-3746.
Hill, et al., "Simlex-999: Evaluating Semantic Models with (Genuine) Similarity Estimation", In Journal of Computational Linguistics, vol. 41, Issue 4, Aug. 31, 2015, pp. 665-695.
Hu, et al., "Few-Shot Representation Learning for Out-of-Vocabulary Words", In Proceedings of the 57th Annual Meeting of the Association for Computational Linguistics, Jul. 28, 2019, pp. 4102-4112.
Huang, et al., "GlossBERT: BERT for Word Sense Disambiguation with Gloss Knowledge", In Proceedings of the Conference on Empirical Methods in Natural Language Processing and the 9th International Joint Conference on Natural Language Processing, Nov. 3, 2019, pp. 3509-3514.
Huang, et al., "Improving Word Representations via Global Context and Multiple Word Prototypes", In Proceedings of the 50th Annual Meeting of the Association for Computational Linguistics, vol. 1: Long Papers, Jul. 8, 2012, pp. 873-882.
Jaakkola, et al., "A Variational Approach to Bayesian Logistic Regression Models and their Extensions", In Proceedings of the Sixth International Workshop on Artificial Intelligence and Statistics, Jan. 5, 1997, pp. 283-294.
Johnson, et al., "MIMIC-III, A Freely Accessible Critical Care Database", In Journal of Scientific Data, vol. 3, Issue 1, May 24, 2016, 9 Pages.
Koren, et al., "Matrix Factorization Techniques for Recommender Systems", In The Journal of Computer, vol. 42, Issue 8, Aug. 7, 2009, pp. 30-37.
Levine, et al., "SenseBERT: Driving some sense into bert", In Repository of arXiv:1908.05646v1, Aug. 15, 2019, 10 Pages.
Li, et al., "Collaborative Variational Autoencoder for Recommender Systems", In Proceedings of the 23rd ACM SIGKDD International Conference on Knowledge Discovery and Data Mining, Aug. 13, 2017, pp. 305-314.
Li et al., "Joint Embedding of Hierarchical Categories and Entities for Concept Categorization and Dataless Classification", In Proceedings of COLING, the 26th International Conference on Computational Linguistics: Technical Papers, Dec. 11, 2016, pp. 2678-2688.
Liang, et al., "Variational Autoencoders for Collaborative Filtering", In Proceedings of the World Wide Web Conference, Apr. 23, 2018, pp. 689-698.
Lin, et al., "Projection Word Embedding Model with Hybrid Sampling Training for Classifying ICD-10-Cm Codes: Longitudinal Observational Study", In Journal of JMIR medical informatics, vol. 7, Issue 3, Jul. 23, 2019, 16 Pages.
Liu, et al., "RoBERTa: A Robustly Optimized BERT Pretraining Approach", In Repository of arXiv:1907.11692v1, Jul. 26, 2019, 13 Pages.
Luong, et al., "Better Word Representations with Recursive Neural Networks for Morphology", In Proceedings of the Seventeenth Conference on Computational Natural Language Learning, Aug. 8, 2013, pp. 104-113.
Mackay, Davidj., "The Evidence Framework Applied to Classification Networks", In Journal of Neural Computation, vol. 4, Issue 5, Sep. 1992, pp. 720-736.
Mikolov, et al., "Distributed Representations of Words and Phrases and their Compositionality", In Proceedings of Advances in Neural Information Processing Systems, Dec. 5, 2013, 9 Pages.
Miller, et al., "A Semantic Concordance", In Proceedings of the Workshop on Human Language Technology, Mar. 21, 1993, pp. 303-308.
Miller, et al., "Introduction to WordNet: An on-line lexical database", In Journal of International Journal of Lexicography, vol. 3, Issue 4, Dec. 1, 1990, 86 pages.
Miller, George A., "WordNet: A Lexical Database for English", In Journal of Communications of the ACM, vol. 38, Issue 11, Nov. 1, 1995, pp. 39-41.
Muzellec, et al., "Generalizing Point Embeddings using the Wasserstein Space of Elliptical Distributions", In Proceedings of the 32nd International Conference on Neural Information Processing Systems (NeurIPS), Dec. 3, 2018, 12 Pages.
Zhang, et al., "Using Bayesian Network and Neural Network Constructing Domain Ontology", In Proceedings of WRI World Congress on Computer Science and Information Engineering, Mar. 31, 2009, pp. 116-120.
Pan, et al., "A Bayesian Network Approach to Ontology Mapping", In Proceedings of 4th International Semantic Web Conference, Nov. 6, 2005, pp. 563-577.
Paquet, et al., "One-Class Collaborative Filtering With Random Graphs", In Proceedings of 22nd International Conference on World Wide Web, May 13, 2013, pp. 999-1008.
Pennington, et al., "Glove: Global Vectors for Word Representation", In Proceedings of the Conference on Empirical Methods in Natural Language Processing (EMNLP), Oct. 25, 2014, pp. 1532-1543.
Peters, et al., "Knowledge Enhanced Contextual Word Representations", In Proceedings of the Conference on Empirical Methods in Natural Language Processing and the 9th International Joint Conference on Natural Language Processing, Nov. 3, 2019, pp. 43-54.
Nguyen, Eric, "Text Mining and Network Analysis of Digital Libraries in R", In Journal of Data Mining Applications with R, 2013, pp. 95-115.

\* cited by examiner

REPRESENTATION LEARNING WITH SIDE INFORMATION

BACKGROUND

Representation learning is a set of techniques that enable a machine learning model to automatically discover representations from raw data that allow for feature detection or classification. Entity representation learning is an active research field with applications in natural language understanding (NLU) recommender systems, recommender systems medical informatics, and more. Existing representation learning models learn representations by observing co-occurrences that appear in large datasets in a self-supervised fashion. For example, in a corpus of medical texts, two words that appear near one another in high frequency may be presumed to have an implicit relation to one another. Likewise, if several users have highly rated a same pair of movies, it may be presumed that the movies have some similarities to one another such that they appeal to a same user base.

However, these datasets often incorporate a long-tail of rare (cold) entities with very little co-occurrence data. As a result, rare entities are often poorly represented in the resulting model. In the case of learning natural language word representations, a common technique to mitigate the cold entity problem is to increase the training dataset size. However, it has been shown that even when increasing the amount of co-occurrence data, the existence of rare, out-of-vocabulary entities still persists in many cases.

SUMMARY

Figure 1:
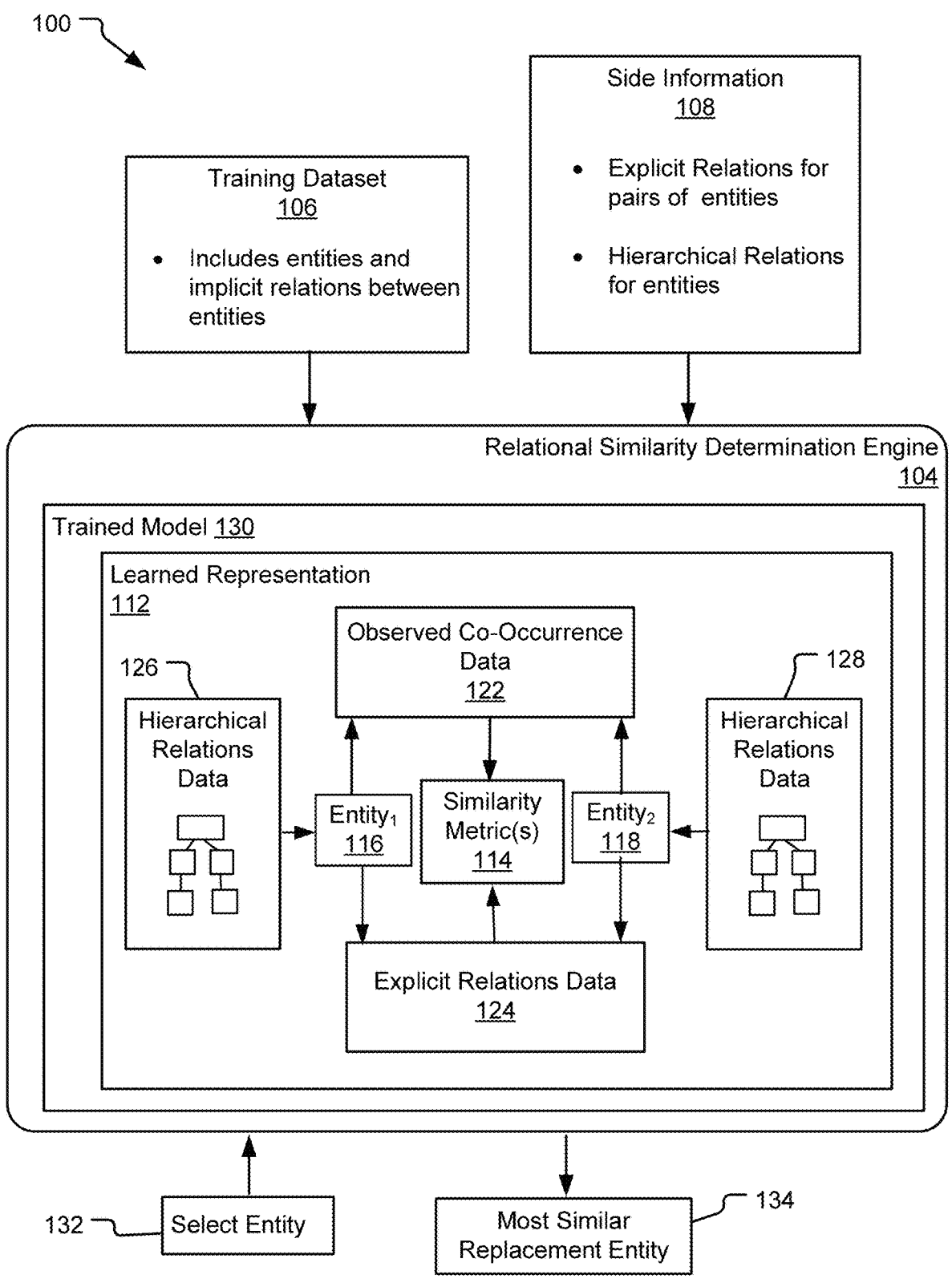
FIG. 1 illustrates an example system for determining relational similarity between entities.

According to one implementation, a method for determining relational similarity between entities comprises training a machine learning (ML) model with a dataset defining entities and including co-occurrence data. The model is additionally trained with side information defining explicit relations between the entities. The method further comprises jointly modeling the co-occurrence relations and the explicit relations for the entities and using the model to compute one or more similarity metrics for each different pair of entities. The method still further comprises identifying, based on the computed similarity metrics, a most similar replacement entity from the dataset for each of the entities within the dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Traditional representation learning systems learn representations of entities by observing co-occurrences (implicit inferences) in large data sets. This approach is limited in effectiveness, particularly for cold entities that appear infrequently and for which there is limited data. For example, consider the words 'anode' and 'cathode,' which are both specific types of electrodes. Assume, in a given corpus, that the word 'cathode' appears frequently while the words 'anode' and 'electrode' either do not appear or appear infrequently. Models that relies solely on co-occurrence relations fail to infer the semantic proximity between 'cathode' and 'anode.'

Unlike traditional representation learning models that learn representations by observing co-occurrences, the representation learning models disclosed herein further utilize side information, such hierarchical priors and/or explicitly-defined relations between entities, to learn entity representations. This use of side information helps to avoid the cold entity problem described above. For example, this approach may allow a model to learn a representation for the parent word 'electrode' based on its child 'cathode.' The parent word 'electrode' serves as an informative prior for 'anode' and the learned representation of 'anode' depends on this prior 'electrode.' This approach leads to a significantly more accurate representation than that achieved via the random initialization of "anode."

In general, the modeling techniques disclosed herein allow measuring relational similarity between entities with a high degree of accuracy so as facilitate the recommendation or selection of one entity as a replacement for another. Systems implementing such techniques have applicability in a variety of fields including translation system, systems that perform sentence completion, question/answering, sentiment analysis, recommendation systems (e.g., systems that recommend songs or movies based on the user's past entertainment picks), etc.

According to one implementation, a representation learning model disclosed herein jointly models multiple types of complimentary relations to measure similarity between entities in a dataset. This joint modeling may include (1) implicit relations (co-occurrences) that capture semantic and syntactic information between entities; (2) explicit hierarchical relations via a network for informative priors that enables information propagation between entities; and/or (c) explicit relational information that enforces structure and consistency between related entities. In contrast to traditional representation learning methods, this approach yields better representations of cold entities that suffer from insufficient statistics and better performance in small data scenarios. In some implementations, the joint modeling is performed using a Variational Bayes (VB) optimization algorithm that maps learned entities onto probability densities. This Bayesian approach computes and factors in uncertainties in the learned representations of entities for which there is limited co-occurrence data, leading to more accurate similarity measurements that other approaches that depend on parameter optimization.

FIG. 1 illustrates an example system 100 for determining relational similarity between entities. The system 100 includes a relational similarity determination engine 104 that learns representations for entities present in a dataset (e.g., a training dataset 106) and that measures similarity between the learned representations to identify a most similar replacement 134 for one or more select entities in the training dataset 106.

The form and content of the training dataset 106 is implementation-specific and depends on the purpose to be served by the system 100. In one implementation where the system 100 is utilized as a tool to further natural language understanding (NLU), the training dataset 106 includes a corpus of English (or other language) texts, such as the SemCor Corpus—an English corpus with semantically-annotated texts. In an implementation where the system 100 is utilized as a tool to further AI learning with respect to a particular industry or nuanced subject, the training dataset is a subject-matter-specific corpus, such as a medical informatic dataset (e.g., medical diagnoses made for tens of thousands of patients). In still another implementation where the system 100 is part of a recommender system (e.g., to recommend music, movies), the training dataset 106 identifies specific users and items those users have favorably interacted with. For example, the training dataset 106 may identify users and movies or songs that those individual users have rated highly on a given platform, such as in excess of 3.5/5 stars or other threshold.

Implicit relations can be learned from observing entity co-occurrences in any of the above types of training datasets. For example, in a medical corpus or natural language text, implicit relations can be learned from observing co-occurrences of entities in the various texts of the dataset, such as by observing a frequency in which different entities appear together and/or the separation between entities associated with each co-occurrence. Likewise, in a dataset consisting of movie or music ratings (e.g., a collaborative filtering dataset), implicit relations can be learned from observing co-consumed items, such as instances where multiple items are consumed by a same user or instances where different users have consumed the same items.

In addition to the training dataset 106, the relational similarity determination engine 104 also accepts as an input the side information 108. By example and without limitation, the side information 108 is shown to include explicit relations defined between the entities of the training dataset and/or hierarchical relations defined for individual entities within the training dataset. Notably, some implementations of the system 100 may utilize both explicit relations and hierarchical relations; other implementations may use one of these two types of side information but not the other.

As used herein, an explicit relation is a relation between two or more entities that can be characterized by an explicitly provided "relation type" identifier. For example, the relation type specifies a semantic or syntactic relationship (e.g., relation type is "synonym" when the two entities are synonyms, "antonym" when the two words are antonyms, "meronym" when the two entities are meronyms). In recommender systems, the "relation type" for an explicit relation may indicate a fact that two entities have in common. For example, two movies may have a same main actor, a same producer, director, etc.

In FIG. 1, the side information 108 input to the model further includes hierarchical relations, which refers to a hierarchy of one or more higher-level hierarchical priors usable to classify an individual entity in the training dataset 106. For example, the entity "poodle" may be classified by the hierarchical priors "animal" and "dog" (e.g., animal→dog→poodle). Likewise, in music recommendations, taxonomy exhibits the following hierarchy: genre→subgenre→artist→song, where each parent entity is used as a prior over its child entity.

Based on the training dataset 106 and the side information 108, the relational similarity determination engine 104 models (learns) a representation for each entity pair in the training dataset 106. By example and without implementation, FIG. 1 illustrates a learned representation 112 for a single pair of entities 116 and 118. This learned representation is part of a trained model 130, and the representation may depend on any or all of the data types shown. In the example where the entities are songs, the co-occurrence data may indicate a subset of users that rated both of the songs highly. In the case of a "cold" entity (e.g., a brand new movie) there may exist very little to no co-occurrence data 122.

In addition to the observed co-occurrence data 122, the learned representation 112 of the entities 116, 118 also depends upon explicit relations data 124. In the above example where the entities 116 and 118 are songs, the explicit relations data (e.g., relation type identifier) may specify a fact in common to both songs, such as that the songs were written by a same songwriter or that a same vocalist is featured on each track. In an example where the entities 116 and 118 are movies, the explicit relations data may indicate that the two movies have a same director. In an example where the entities are terms in a natural language text, the explicit relationship data may indicate that the entities are synonyms, antonyms, meronyms, or share some other syntactic or sematic relationship.

The observed co-occurrence data 122 and explicit relation data 124 are inputs used to compute a similarity metric 114 quantifying the relative similarity of the entities 116 and 118 to each other. In some implementations, the co-occurrence data 122 and the explicit relations data 124 may be further enriched by hierarchical relations 126, 128 that is defined with respect to the entities 116, 118. For instance, in the example where the entities 116 and 118 are songs (e.g., in a recommender system), the hierarchical relations 126, 128 may specify hierarchical priors such as one or more of a genre, subgenre, artist, and album for each entity 116, 118. In the event that one of the entities is a cold entity with insufficient co-occurrence data, the hierarchical priors may serve as "fallbacks" to help inform the computation of the similarity metric 114.

According to one implementation, the system 100 uses the inputs described above to learn a representation for each and every entity in the training dataset 106 and to compute a similarity metric for every identified pair of entities in the training dataset. In one implementation, the process of generating the learned representation 112 for all entity pairs includes mapping entities onto nodes of a Bayesian network and computing one or more posterior predictive distributions (e.g., an example similarity metric 114) for each pair.

Once the trained model 130 is generated as described above, the relationship similarity determination engine 104 may receive as an input a select entity 132 of the entities appearing the training dataset 106 and, in response, output a "most similar replacement entity 134," where the most similar replacement entity 134 is selected based on the computed similarity metric 114 for the select entity 132 in relation to all other entities in the training dataset 106. In one implementation, the select entity 132 and the "most similar replacement entity 134" represent the pair of entities having a similarity metric representative of a highest degree of similarity of all entity pairs in the training dataset 106.

Figure 2:
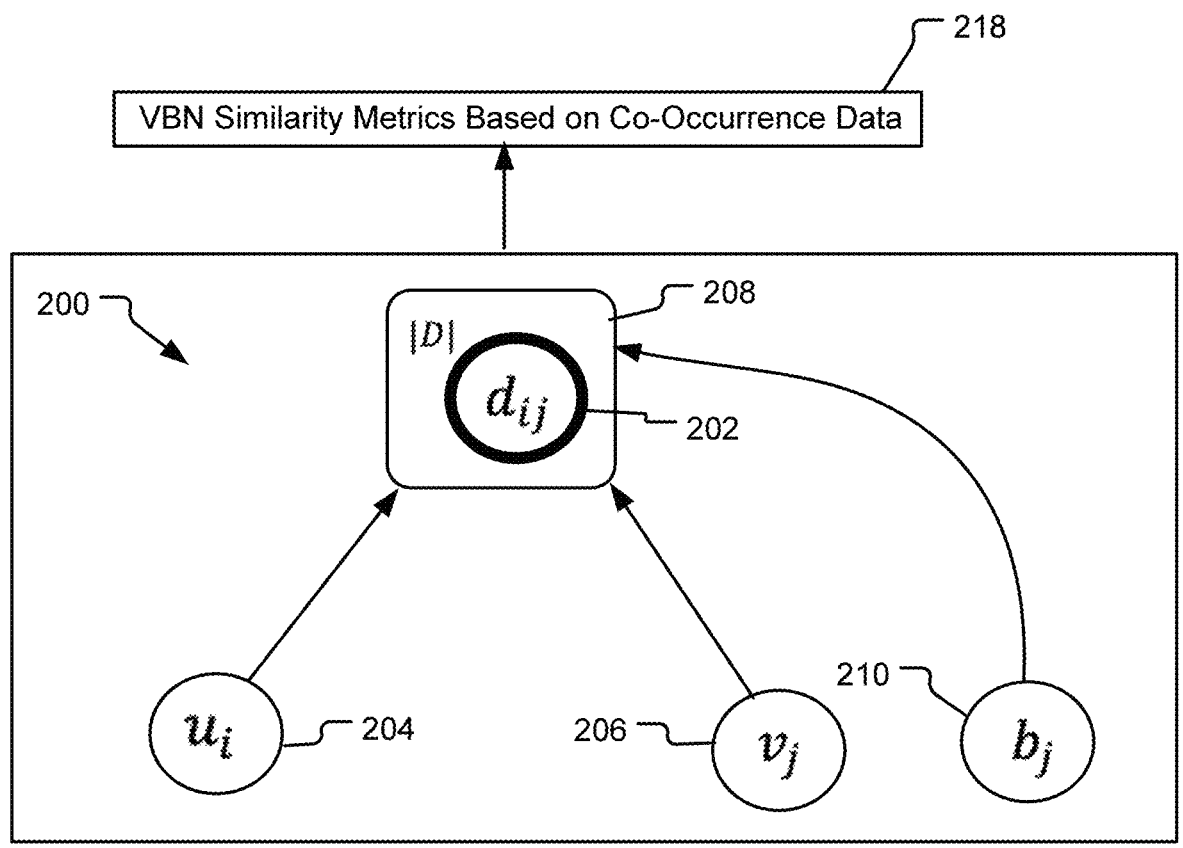
FIG. 2 illustrates aspects a Variational Bayesian Network (VBN) that performs representation learning techniques to determine relational similarities between entities.

FIG. 2 illustrates aspects a Variational Bayesian Network (VBN 200) that performs representation learning techniques to determine relational similarities between entities in a dataset. VBN is a probabilistic graphical model in which an entity 'i' can appear as either a leaf node, a parent (internal) node, or both. Specifically, each entity i is associated with two leaf representations $u_i$ (node 204) and $v_j$ (node 206). Entity nodes present unobserved representations that are being learned by way of inter-node relations (edges) to compute probability distributions representing similarities between each pair of entities in the dataset.

As input, the VBN 200 receives a training dataset including a number of entities and a co-occurrence data (implicit relations between entities). This training dataset may be understood as being the same or similar to the training dataset described with respect to FIG. 1. The VBN 200 generates similarity metrics 218 based on co-occurrence data. In one implementation, these similarity metrics assume the form of posterior predictive distributions (described below).

Figure 3:
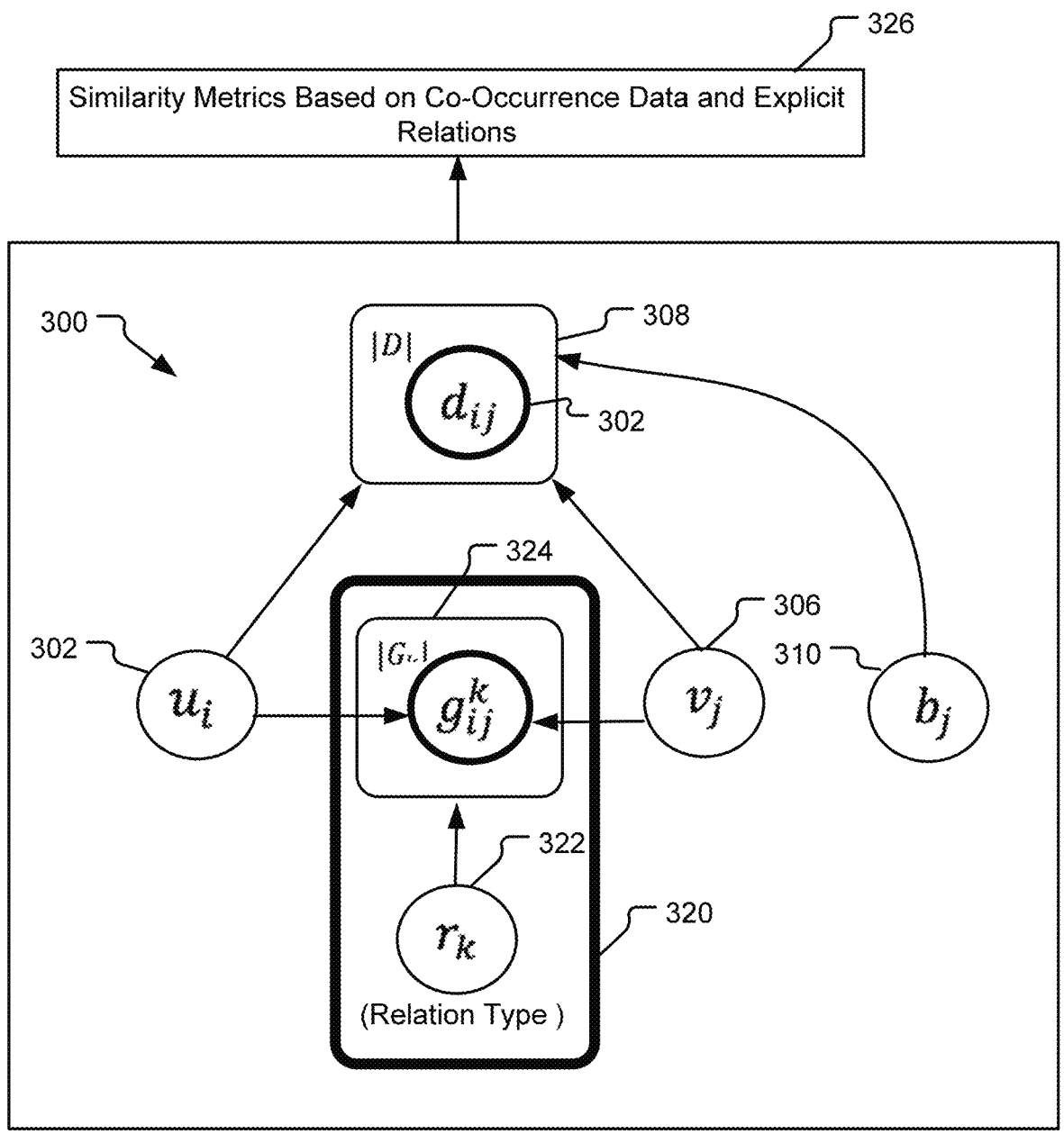
FIG. 3 illustrates aspects of another VBN that utilizes explicit relations between entities in addition to co-occurrence data (implicit relations) to determine relational similarities between the entities.
Figure 4:
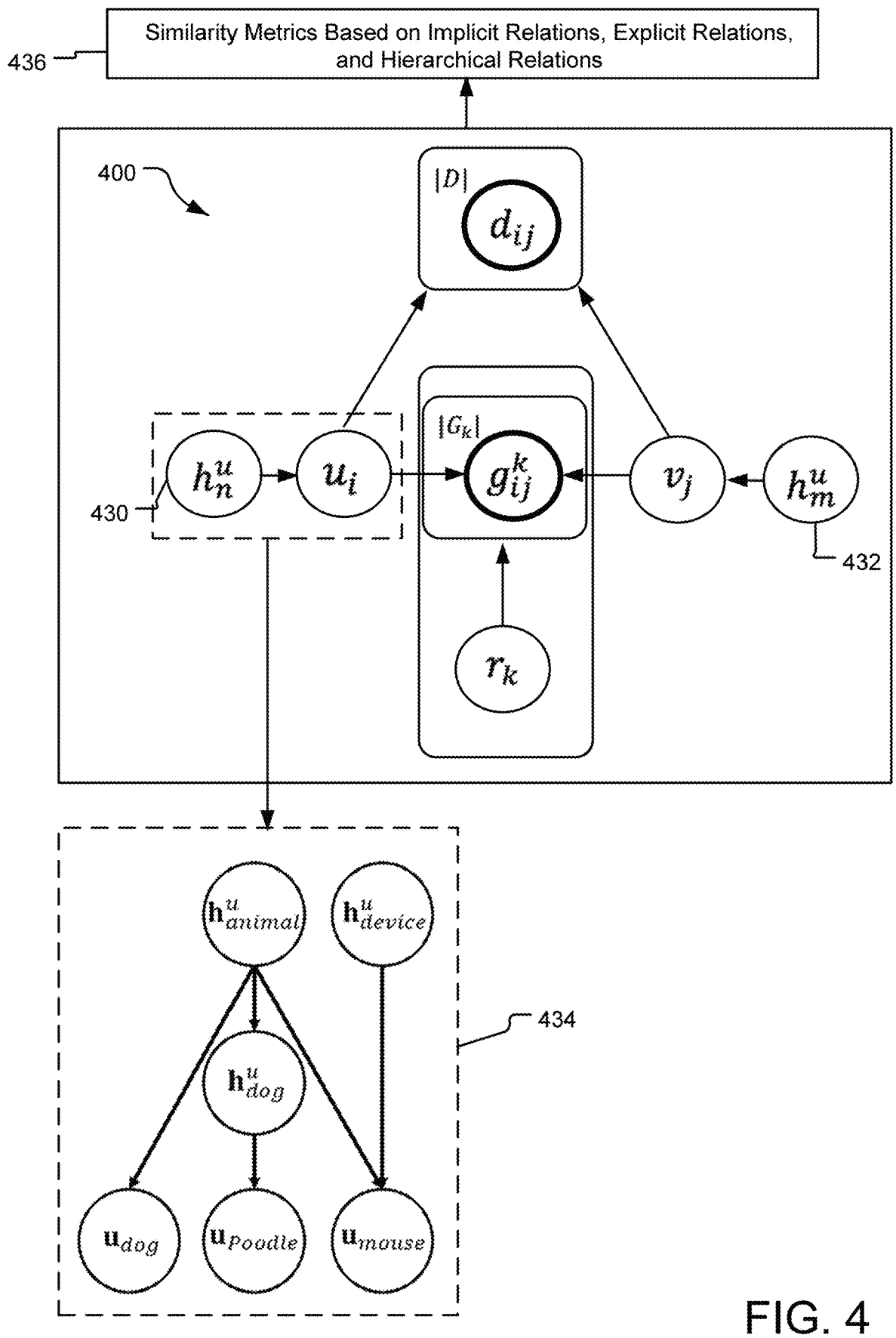
FIG. 4 illustrates aspects of another VBN that utilizes implicit relations, explicit relations, and hierarchical relations to determine relational similarities between the entities.
Figure 5:
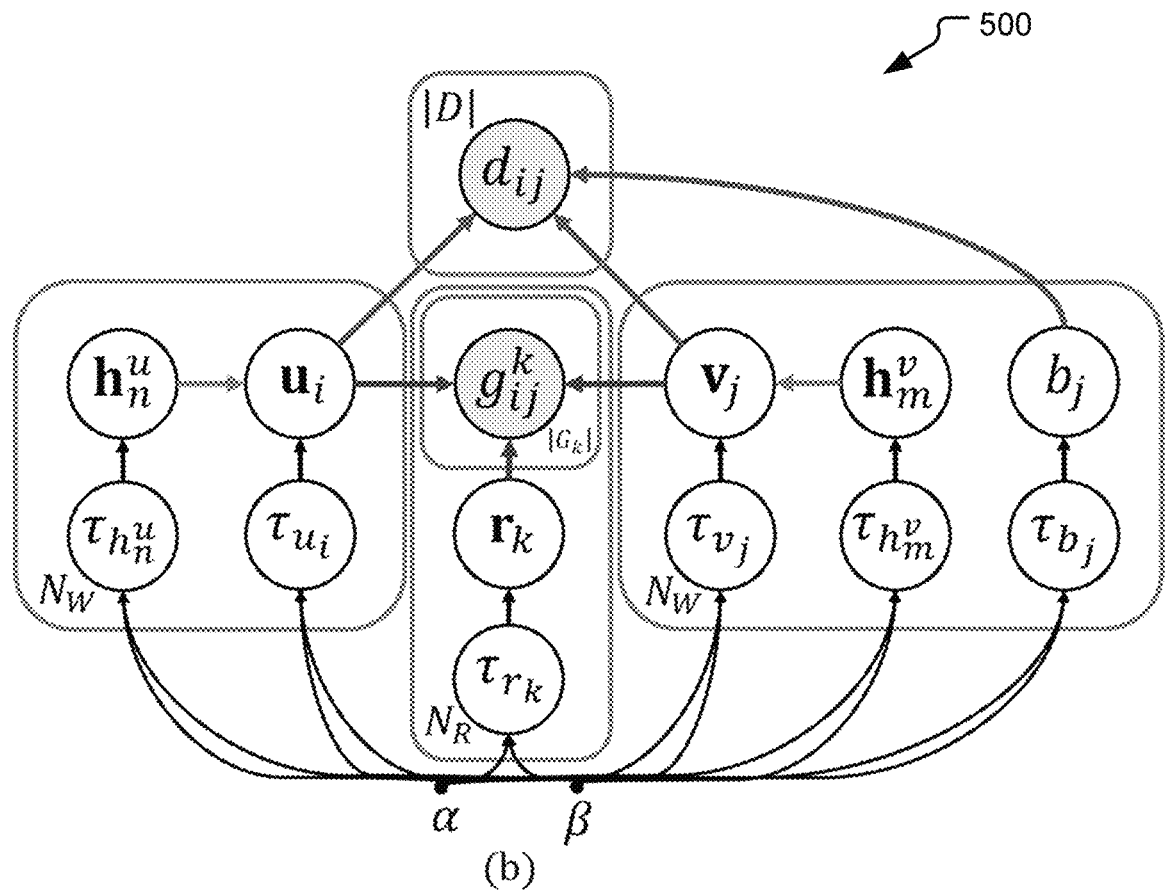
FIG. 5 illustrates additional aspects of a VBN network implementing the disclosed technology.

In FIG. 2, the diagram of VBN 200 is over-simplified to introduce notation and concepts that are explored further with respect to FIG. 3-5, which each illustrate VBNs with additional types of nodes serving different purposes. In the VBN of FIG. 2, the subscripts i and j represent indices in a same set of entities, where i≠j. The usage of both i and j to represent various terms in the same entity set allows for co-occurrences to be defined based on order. For example, $u_i v_j$ means that an individual occurrence u of the entity i appeared before an individual occurrence v of the entity j. In the case of a recommendation system where i and j are titles (e.g., movies), the ordering $u_i v_j$ may imply that a user positively interacted with (watched and rated) movie i before positively interacting with movie.

An event node 202 ($d_{ij}$) represents an individual co-occurrence of the entities i and j in the training dataset. The individual co-occurrence, $d_{ij}$, may be understood as being a 1 or 0 value indicating whether or not the two entities $v_i v_j$ co-occurred. If, for example, the entities are movies (MovieA, MovieB), the co-occurrence term $d_{ij}$ may be set to '1' when an individual user positively interacts with (e.g., watches and gives a high rating to) MovieA and then subsequently positively interacts with MovieB. In contrast, this term may be set to '0' when an individual user does not watch both movies, watches them in the reverse order, or does not rate one of the movies highly.

The dataset |D| (block 208) represents a posterior probability distribution that is given by the body of co-occurrences for entities i and j in the dataset, where i appears in the dataset before j. Notably, a child node 210 ($b_i$) is an input to $d_{ij}$, and represents a bias in the similarity measurement. For instance, it may be true that if j is a popular movie, it has a higher probability of being watched following movie i than an unpopular movie, regardless of the user's liking of movie i. The bias is corrected for via the child node 210. Thus, the dataset |D| represents a similarity metric that is, in this case, conditioned on the co-occurrence data and bias implicit in such data. The VBN 200 may be understood as including number of additional omitted from FIG. 3 for simplicity, such as learned precision variables in the Bayesian algorithm that are collectively used to determine a confidence in the distribution |D|.

During training, the model iterates over all pairs of entities i and j and can thereby identify a 'j' that has a highest relation similarity to 'i' (e.g., is most likely to co-occur with i). In the case where $u_i$ or $v_j$ is a cold entity, there may be insufficient data to reliably compute the posterior probability distribution |D|. Thus, the VBN 200 may perform poorly in these cases.

FIG. 3 illustrates aspects of another VBN 300 that utilizes explicit relations between entities in addition to co-occurrence data to determine relational similarities between the entities. As input, the VBN 300 receives a dataset of a form the same or similar to that described with respect to FIG. 1 or 2. In addition, the VBN 300 also receives as an input explicit relation data defining various type of relations between identified pairs of entities within the input dataset. An analysis of this explicit relations data is represented by analysis block 320.

The analysis block 320 includes a relation type node 322 ($r_k$) that identifies a type of relationship between the entities specified by the node 302 ($u_i$) and the node 304 ($v_j$), representing individual occurrences of i and j, respectively. For example, the relation type ($r_k$) for entities i="wheel" and j="bicycle" may be "meronym" because a wheel is part of a bicycle. Notably, this relationship does not exist when i=bicycle and j=wheel because a bicycle is not part of a wheel. Other exemplary relation types that may be specified by $r_k$ include "antonym," and "synonym." In systems where the entities are media titles (e.g., movies, songs), the relation type ($r_k$) may specify non-semantic relations such as relations between collaborators (e.g., "same actor," when two films share a same actor; "same director" when two films share a same director); or relations usable to classify the entities (e.g., "same soundtrack" when two songs appear on the same movie soundtrack; "same genre" when two songs or movies share a same genre classifier).

To calculate a relative similarity between entities i and j, the VBN 300 computes two different posterior predictive distributions. A first posterior probability distribution |D| (block 308) represents a relational similarity between an entity j to an entity i based on the co-occurrence data implicit in the input dataset. The second posterior probability distribution block |G| (block 324) represents a relational similarity of entity i to an entity j based on a directed relation k, where k is the explicit relation type specified as input to the model.

The VBN 300 outputs a similarity metric 326 that is based on both the co-occurrence data and the explicit relations. In one implementation, this similarity metric 326 represents a joint log distribution of |D| and |G|. The VBN 300 may include a number of additional nodes not shown in FIG. 3 for simplicity, such as learned precision variables in the Bayes algorithm that are collectively used to determine a confidence in the respective distributions |D| and |G|. Nodes shown but not explicitly described with respect to FIG. 3 may be assumed to serve the same or similar function to like-named nodes described with respect to FIG. 2.

FIG. 4 illustrates aspects of another VBN 400 that utilizes explicit relations, hierarchical relations, and implicit relations (co-occurrences) to determine relational similarities between the entities. In addition to receiving a dataset including implicit relations and explicit relations data, the VBN 400 also receives as an input hierarchical relations data 430, 432 associated with the various entities in the input dataset. The hierarchical relations data 430, 432 specifies one or more hierarchical priors for the individual entities in the input dataset. As explained above with respect to the VBN of FIG. 2, each entity i can appear as either a leaf node, a parent node, or both. Entity nodes are unobserved variables (representations) that are being learned. Specifically, each entity i is associated with two leaf representations $u_i$, $v_i$. FIG. 4 further introduces the concept of parent nodes, $h_i^u$ and $h_i^v$ that are the parent representations of entity i. Hence, if entity i is a parent of entity j, then the nodes $h_i^u$ and $h_i^v$ serve as parents to the nodes $u_j$, $v_j$, respectively. In addition, every node can have multiple parents and children.

Expanded view 434 illustrates an example of hierarchical priors for a subset of entities (dog, poodle, and mouse) included in the dataset. Note that only the 'u' part is shown. The 'v' part is symmetric. In this example, $h_{animal}^u$ is the parent of $h_{dog}^u$, $u_{dog}$, and $u_{mouse}$. It is important to distinguish between $u_{dog}$ that represents the entity "dog" and $h_{dog}^u$ which represents the category dog, which is in turn a parent of $u_{poodle}$, which represents the entity Poodle (dog breed). Note that $u_{mouse}$ has two parents: $h_{animal}^u$ and $h_{device}^u$, as the word "mouse" is ambiguous and could, without context, refer to either a computing accessory or to an animal. Further note that the word representations of the entities animal and device are given by leaf nodes $u_{animal}$ and $u_{device}$, as shown.

In an exemplary music recommendation systems, a defined taxonomy for a song may exhibit the following hierarchy: genre→subgenre→artist→song, where each parent entity is used as a prior over its child entity. Likewise, movies may have a genre and subgenre. When hierarchical relations are represented as vectors (e.g., as shown), known Bayesian methods can be employed to enforce entity representations to be close to their parents in terms of $L^2$ distance. This enables a fallback from a node to its parent in the case of insufficient statistics. Assume, for example, a node $u_{song1}$ represents a newly-released song for which there is insufficient co-occurrence data. Given the existence of a parent node $h_{artist1}^u$ representing the artist of the song and a known distance between the child node and the parent node, $h_{artist1}^u$, the VBN 400 can replace the child node with the parent node in the computation of $d_{ij}$ or $g_{ij}^k$ and still determine a joint distribution quantifying the relational similarity between the cold entity ($u_{song1}$) and another entity ($v_{song2}$), all while factoring in the known distance between child and parent to correct for this substitution. This unique use of hierarchical priors can significantly improve the representation of cold entities in the resulting models.

The VBN 400 computes similarity metrics 436, which may be understood as joint distributions for pairs of entities that are computed based on a combination of implicit relations, explicit relations, and hierarchical relations. Using these computed metrics, a "most similar replacement entity" can be identified for each entity in the dataset.

Aspects of the VBN 400 shown but not explicitly described with respect to FIG. 4 may be assumed to serve the same or similar functions to like-named features of the VBNs described with respect to FIG. 2 or 3.

FIG. 5 illustrates additional aspects of a VBN network 500 implementing the disclosed technology. In addition to illustrating the nodes described above with respect to FIGS. 2, 3, and 4, FIG. 5 further illustrates learned precision variables of the Bayesian network that are represented by nodes $\tau_{h_n^u}$, $\tau_{u_j}$, $\tau_{r_k}$, $\tau_{v_j}$, $\tau_{h_n^v}$ and $\tau_{b_i}$. These learned precision variables are used to compute a confidence in each similarity metric computed (e.g., each T term represents 1 over the variance of the model). The unique capability of Bayesian algorithms to precisely account for confidence in each probability distribution enables better treatment of uncertainty related to cold entities for which there is not much co-occurrence data. This is in contrast to point estimate solutions that map latent variables onto parameters to optimize rather than probability densities.

Figure 6:
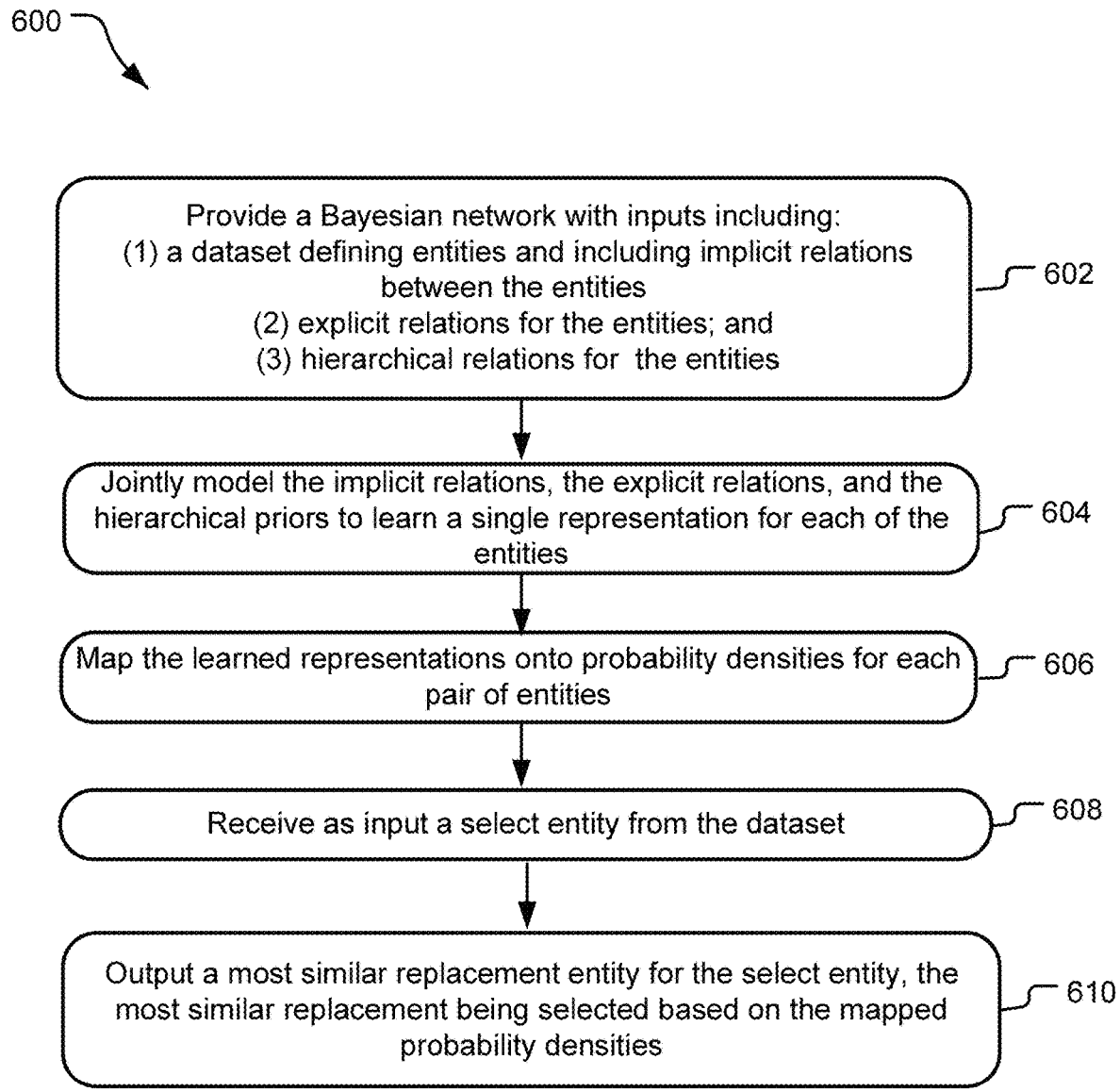
FIG. 6 illustrates example operations for learning representations of entities based on implicit relations between the entities, explicit relations between the entities, and hierarchical relations for the individual entities.

FIG. 6 illustrates example operations 600 for learning representations of entities based on implicit relations between the entities, explicit relations between the entities, and hierarchical relations for the individual entities. An input operation 602 provides a Bayesian network with three types of inputs.

A first input is a dataset that includes entities and that can be analyzed to identify implicit relations between the entities. The Bayesian network initializes each of the entities as a child "leaf" node. These child nodes may also serve as parent nodes for other entities in the dataset through linkages that are formed during a subsequent joint modeling operation (operation 604). The dataset may be, for example, a textual corpus or a collaborative filtering dataset.

A second input includes explicit relations defined for pairs of the entities in the dataset. Each explicit relation for a pair of entities is defined by a "relation type" identifier, which defines a nature of the explicit relationship. The defined explicit relations are used to inform representations of the defined leaf nodes (entities) with respect to one another.

A third input to the Bayesian network includes hierarchical relations defined for one or more of the entities in the dataset. For each entity in the dataset, the hierarchical relations may include one or more hierarchical priors that are defined as parent nodes (or parent, grandparent, great-grandparent, etc.) with respect to the entity.

A joint modeling operation 604 jointly models the implicit relations between the entities, the explicit relations between the entities, and the hierarchical relations between entities and their defined hierarchical priors. As the model iterates through each pair of entities, the model may identify further relations between entities and form further node linkages representing the newly-identified relations. For example, two entities initially defined as child nodes may become hierarchically linked as parent-child (e.g., due to overlap in their respective branches and leaves); likewise, a relationship initially defined between child nodes may be extended to inform the representation of one or more parent nodes.

As the model iterates through pairs of the entities, the network of nodes and linkages between nodes continues to grow until convergence is reached. A mapping operation 606 maps the learned representations onto probability densities for each pair of entities in the dataset. A querying operation 608 queries the trained model with a select entity present in the dataset, and a receiving operation 610 receives as output from the trained model a "most similar replacement entity" for the select entity that has been selected based on the probability densities. The most similar replacement entity is, for example, an entity with a highest probability of relational similarity to the select entity.

Figure 7:
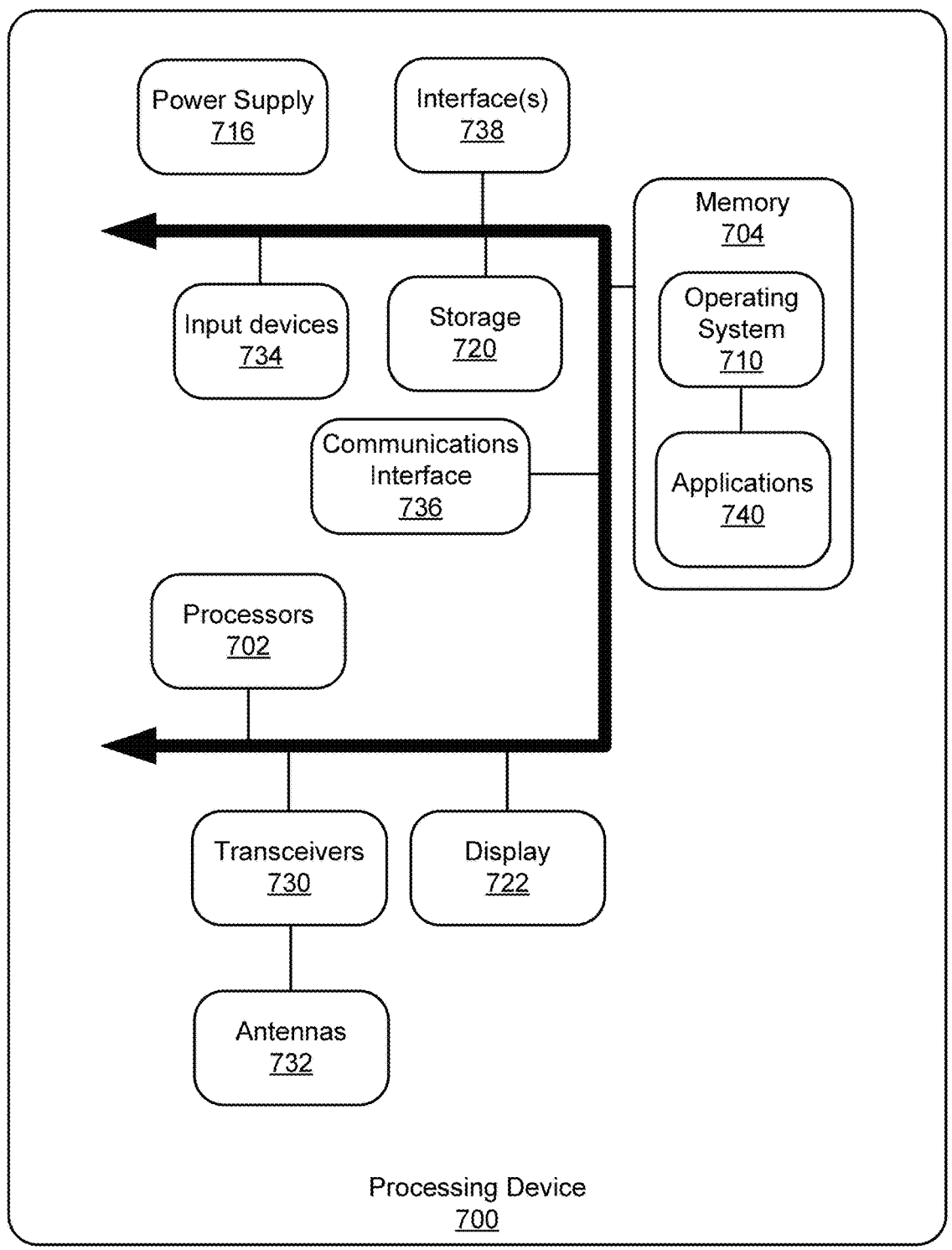
FIG. 7 illustrates an example processing device suitable for implementing aspects of the disclosed technology.

FIG. 7 illustrates an example schematic of a processing device 700 that may be suitable for implementing aspects of the disclosed technology. The processing device 700 includes processors 702 (e.g., a CPU and a USB controller controller), memory 704, a display 722, and other interfaces 738 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processor(s) 702, although it should be understood that other operating systems may be employed.

One or more applications 740, such as a relational similarity determination engine (FIG. 1, 104) and/or Variational Bayesian network (VBN) are loaded in the memory 704 and executed on the operating system 710 by one or more of the processors 702. Applications 740 may receive input from various input local devices (not shown) such as a microphone, keypad, mouse, stylus, touchpad, joystick, etc. Additionally, the applications 740 may receive input from one or more remote devices, such as remotely-located smart devices, by communicating with such devices over a wired or wireless network using more communication transceivers 730 and an antenna 732 to provide network connectivity (e.g., a mobile phone network, Wi-Fi®, Bluetooth®). The processing device 700 further includes storage 720 and a power supply 716, which is powered by one or more batteries and/or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein provides for training a machine learning (ML) model with inputs including: (1) a dataset defining entities and including co-occurrence data, the co-occurrence data including co-occurrence relations for pairs of the entities within the dataset; and ( ) side information defining explicit relations between the entities, each of the explicit relations identifying a relationship type for a pair of the entities in the dataset. The machine learning model jointly models the co-occurrence relations and the explicit relations for the entities and computes one or more similarity metrics for each different pair of the entities within the dataset. Based on the computed similarity metrics, a most similar replacement entity from the dataset is identified for each of the entities within the dataset. Tor a select entity received as an input, the identified most similar replacement entity is output.

In an example method of any preceding method, the side information further includes hierarchical relations in addition to the explicit relations. Each of the hierarchical relations provides a network of informative priors for an individual entity within the dataset.

In another example method of any preceding method, jointly modeling further comprises jointly modeling the hierarchical relations, co-occurrence relations, and the explicit relations to compute the one or more similarity metric for each different pair of the entities within the dataset.

In still another example method of any preceding method, jointly modeling the hierarchical relations, co-occurrence relations, and the explicit relations further comprises learning a single representation for each of the entities within the dataset that is informed by the hierarchical relations for the entity, the explicit relations for the entity, and the co-occurrence relations for the entity.

In yet still another example method of any preceding method, the joint modeling the co-occurrence relations and explicit relations includes mapping the entities onto probability densities computed by a Bayesian network.

In another example method of any preceding method, computing the one or more similarity metrics for each pair of the entities further comprises computing a first posterior predictive distribution based on the co-occurrence relations and computing a second posterior predictive distribution based on the explicit relations.

In yet still another example method of any preceding method, the one or more similarity metrics include a joint distribution based on the first posterior predictive distribution and the second posterior predictive distribution.

In another example method of any preceding method, the method is implemented by a recommendation system and the dataset is a collaborative filtering dataset.

An example system disclosed herein includes a relational similarity determination engine configured to receive as a first input a dataset defining entities and including co-occurrence data and receive as a second input side information defining explicit relations between the entities. The co-occurrence data includes co-occurrence relations for pairs of the entities, and the explicit relations each identify a relationship type for a pair of the entities in the dataset. The relational similarity engine is further configured to jointly model the co-occurrence relations and the explicit relations for the entities to compute a similarity metric for each different pair of the entities within the dataset and to identify, based on the computed similarity metrics, a most similar replacement entity from the dataset for each of the entities within the dataset. For a select entity received as an input, the relational similarity determination engine outputs the identified most similar replacement entity.

In an example system of any preceding system, the side information further includes hierarchical relations in addition to the explicit relations. Each of the hierarchical relations provides a network of informative priors for an individual entity within the dataset.

In yet still another example system of any preceding system, the relational similarity determination engine jointly models the hierarchical relations, co-occurrence relations, and the explicit relations to compute the similarity metric for each different pair of the entities within the dataset.

In another example system of any preceding system, the joint modeling further includes learning a single representation for each of the entities within the dataset that is informed by the hierarchical relations for the entity, the explicit relations for the entity, and the co-occurrence relations for the entity.

In another example system of any preceding system, jointly modeling the co-occurrence relations and the explicit relations includes mapping the entities onto nodes of a Bayesian network.

In still another example system of any preceding system, the relational similarity determination engine maps the entities onto probability densities computed by a Bayesian network.

In yet still another example system of any preceding system, computing the similarity metric for each pair of the entities further comprises computing a first posterior predictive distribution based on the co-occurrence relations and computing a second posterior predictive distribution based on the explicit relations.

In still another example system of any preceding system, the co-occurrence relations are included within a collaborative filtering dataset.

An example computer process disclosed herein provides for training a machine learning (MIL) model with inputs including a dataset defining entities and including co-occurrence data and side information defining explicit relations between the entities. The co-occurrence data includes co-occurrence relations for pairs of the entities, and each of the explicit relations identifies an explicit relationship and a relationship type for a pair of the entities in the dataset. The computer process further provides for jointly modeling the co-occurrence relations and the explicit relations for the entities to compute a similarity metric for each different pair of the entities within the dataset and, based on the computed similarity metrics, identifying a most similar replacement entity from the dataset for each of the entities within the dataset. For a select entity received as an input, the computer process outputs the identified most similar replacement entity.

In an example computer process of any preceding computer process, the side information further includes hierarchical relations in addition to the explicit relations. Each of the hierarchical relations provides a network of informative priors for an individual entity within the dataset.

In an example computer process of any preceding computer process, the joint modeling includes jointly modeling the hierarchical relations, co-occurrence relations, and the explicit relations to compute the similarity metric for each of the different pairs of the entities within the dataset.

In still another example computer process of any preceding computer process, jointly modeling the co-occurrence relations and the explicit relations includes mapping the entities onto probability densities computed by a Bayesian network.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
    training a machine learning (ML) model with inputs including:
        a dataset defining entities and including co-occurrence data, the co-occurrence data including co-occurrence relations for pairs of the entities within the dataset; and
        side information defining explicit relations between the pairs of the entities, the side information including an explicitly-provided relation type identifier that identifies a relationship type for multiple of the pairs of the entities in the dataset; and
    jointly modeling, with the ML model, the co-occurrence relations and the explicit relations for the pairs of the entities to compute similarity metrics for different pairs of the entities within the dataset, the similarity metrics for a given pair of the entities including:
        a first probability distribution representing a relational similarity between two entities of the given pair based on the co-occurrence relations for the two entities within the dataset;
        a second probability distribution representing a second relational similarity between the two entities of the given pair based on the explicitly-provided relation type identifier for the given pair; and
        a joint probability distribution that is based on the first probability distribution and the second probability distribution;

based on the similarity metrics, identifying a most similar replacement entity from the dataset for each of the entities within the dataset; and for a select entity received as an input, outputting the most similar replacement entity.

2. The method of claim 1, wherein the side information further includes hierarchical relations in addition to the explicit relations, each of the hierarchical relations providing a network of informative priors for an individual entity within the dataset.

3. The method of claim 2, wherein jointly modeling further comprises:

jointly modeling the hierarchical relations, co-occurrence relations, and explicit relations to compute at least one of the similarity metrics for each different pair of the entities within the dataset.

4. The method of claim 2, wherein jointly modeling the hierarchical relations, co-occurrence relations, and the explicit relations further comprises:

learning a single representation for each of the entities within the dataset that is informed by the hierarchical relations for the entity, the explicit relations for the entity, and the co-occurrence relations for the entity.

5. The method of claim 1, wherein joint modeling the co-occurrence relations and explicit relations includes mapping the entities onto probability densities computed by a Bayesian network.

6. The method of claim 5, wherein
the first probability distribution is a first posterior predictive distribution based on the co-occurrence relations and the second probability distribution is a second posterior predictive distribution based on the explicit relations.

7. The method of claim 6, wherein the the joint probability distribution is based on the first posterior predictive distribution and the second posterior predictive distribution.

8. The method of claim 1, wherein the method is implemented by a recommendation system and the dataset is a collaborative filtering dataset.

9. A system comprising:

a relational similarity determination engine stored in memory and configured to:

receive as a first input a dataset defining entities and including co-occurrence data, the co-occurrence data including co-occurrence relations for pairs of the entities; and receive as a second input side information defining explicit relations between the pairs of the entities, the side information including an explicitly-provided relation type identifier that identifies a relationship type for of the pairs of the entities in the dataset; and jointly model the co-occurrence relations and the explicit relations for the entities to compute similarity metrics for each different pair of the entities within the dataset, the similarity metrics for a given pair of the entities including:

a first probability distribution representing a relational similarity between two entities of the given pair based on the co-occurrence relations for the two entities within the dataset;

a second probability distribution representing a second relational similarity between the two entities of the given pair based on the explicitly-provided relation type identifier for the given pair; and a joint probability distribution that is based on the first probability distribution and the second probability distribution;

identify, based on the similarity metrics, a most similar replacement entity from the dataset for each of the entities within the dataset; and for a select entity received as an input, output the most similar replacement entity.

10. The system of claim 9, wherein the side information further includes hierarchical relations in addition to the explicit relations, each of the hierarchical relations providing a network of informative priors for an individual entity within the dataset.

11. The system of claim 10, wherein the relational similarity determination engine jointly models the hierarchical relations, co-occurrence relations, and the explicit relations to compute a similarity metric for each different pair of the entities within the dataset.

12. The system of claim 10, wherein the joint modeling of the hierarchical relations, co-occurrence relations, and the explicit relations further comprises:

learning a single representation for each of the entities within the dataset that is informed by the hierarchical relations for the entity, the explicit relations for the entity, and the co-occurrence relations for the entity.

13. The system of claim 9, wherein jointly modeling the co-occurrence relations and the explicit relations includes mapping the entities onto nodes of a Bayesian network.

14. The system of claim 9, wherein the relational similarity determination engine maps the entities onto probability densities computed by a Bayesian network.

15. The system of claim 9, wherein computing the similarity metric for each pair of the entities further comprises:

computing a first posterior predictive distribution based on the co-occurrence relations and computing a second posterior predictive distribution based on the explicit relations.

16. The system of claim 9, wherein the system is a recommendation system and the co-occurrence relations are included within a collaborative filtering dataset.

17. One or more non-transitory computer-readable storage media encoding processor-executable instructions for executing a computer process, the computer process comprising:

training a machine learning (ML) model with inputs including:

a dataset defining entities and including co-occurrence data, the co-occurrence data including co-occurrence relations for pairs of the entities; and side information defining explicit relations between the pairs of the entities, the side information including an explicitly-provided relation type identifier that identifies a relationship type for each of the pairs of the entities in the dataset; and jointly modeling, with the ML model, the co-occurrence relations and the explicit relations for the entities to compute similarity metrics for each different pair of the entities within the dataset, the similarity metrics for a given pair of the entities including:

a first probability distribution representing a relational similarity between two entities of the given pair based on the co-occurrence relations for the two entities within the dataset;

a second probability distribution representing a second relational similarity between the two entities of the given pair based on the explicitly-provided relation type identifier for the given pair; and a joint probability distribution that is based on the first probability distribution and the second probability distribution;

based on the joint probability distribution, identifying a most similar replacement entity from the dataset for each of the entities within the dataset; and for a select entity received as an input, outputting the most similar replacement entity.

18. The one or more computer-readable storage media of claim 17, wherein the side information further includes hierarchical relations in addition to the explicit relations, each of the hierarchical relations providing a network of informative priors for an individual entity within the dataset.

19. The one or more computer-readable storage media of claim 18, wherein jointly modeling further comprises:

jointly modeling the hierarchical relations, co-occurrence relations, and the explicit relations to compute a similarity metric for each of the different pairs of the entities within the dataset.

20. The one or more computer-readable storage media of claim 17, wherein jointly modeling the co-occurrence relations and the explicit relations includes mapping the entities onto probability densities computed by a Bayesian network.

* * * * *